US011873730B1

(12) United States Patent
Joly et al.

(10) Patent No.: US 11,873,730 B1
(45) Date of Patent: Jan. 16, 2024

(54) GAS TURBINE ENGINE AIRFOIL WITH EXTENDED LAMINAR FLOW

(71) Applicant: Raytheon Technologies Corporation, Farmington, CT (US)

(72) Inventors: Michael M. Joly, Hebron, CT (US); Gorazd Medic, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/070,088

(22) Filed: Nov. 28, 2022

(51) Int. Cl.
*F01D 5/14* (2006.01)
*F01D 9/04* (2006.01)

(52) U.S. Cl.
CPC ............. *F01D 5/141* (2013.01); *F01D 5/148* (2013.01); *F01D 9/041* (2013.01); *F05D 2220/32* (2013.01); *F05D 2240/12* (2013.01); *F05D 2240/30* (2013.01)

(58) Field of Classification Search
CPC .......... F01D 5/141; F01D 5/148; F01D 9/041; F05D 2220/32; F05D 2240/12; F05D 2240/30
See application file for complete search history.

(56) References Cited

U.S. PATENT DOCUMENTS

| | | | | |
|---|---|---|---|---|
| 4,431,376 A * | 2/1984 | Lubenstein | F01D 5/141 416/223 R |
| 5,088,892 A * | 2/1992 | Weingold | F01D 5/145 415/193 |
| 6,079,948 A * | 6/2000 | Sasaki | F04D 29/324 416/223 R |
| 6,264,429 B1 | 7/2001 | Koeller | |
| 8,152,459 B2 | 4/2012 | Sonoda | |
| 10,480,532 B2 | 11/2019 | Pallot | |
| 2006/0275134 A1* | 12/2006 | Hasenjager | F01D 5/141 416/237 |
| 2012/0230834 A1* | 9/2012 | Cornelius | F04D 29/324 416/243 |
| 2013/0224004 A1* | 8/2013 | Radhakrishnan | F01D 9/00 415/207 |
| 2020/0088039 A1 | 3/2020 | Okada | |
| 2021/0087940 A1* | 3/2021 | Clark | F01D 9/042 |

* cited by examiner

*Primary Examiner* — Brian Christopher Delrue
(74) *Attorney, Agent, or Firm* — Getz Balich LLC

(57) ABSTRACT

An apparatus is provided for a gas turbine engine. This engine apparatus includes an airfoil extending spanwise along a span line from a base to a tip. The airfoil extends laterally between a pressure side and a suction side. The airfoil extends longitudinally along a camber line from a leading edge to a trailing edge. The airfoil includes a first section and a second section arranged longitudinally between the first section and the trailing edge along the camber line. An angle between the camber line and a reference plane changes according to a slope as the airfoil extends longitudinally along the camber line. The slope in the second section is greater than the slope in the first section.

20 Claims, 6 Drawing Sheets

GAS TURBINE ENGINE AIRFOIL WITH EXTENDED LAMINAR FLOW

BACKGROUND OF THE DISCLOSURE

1. Technical Field

This disclosure relates generally to a gas turbine engine and, more particularly, to an airfoil for the gas turbine engine.

2. Background Information

A gas turbine engine includes multiple airfoils both configured as stator vane airfoils and rotor blade airfoils. Various types and configurations of airfoils are known in the art. While these known airfoils have various benefits, there is still room in the art for improvement. There is a need in the art, in particular, for an airfoil which can promote extended regions of laminar boundary layer flow.

SUMMARY OF THE DISCLOSURE

According to an aspect of the present disclosure, an apparatus is provided for a gas turbine engine. This engine apparatus includes an airfoil extending spanwise along a span line from a base to a tip. The airfoil extends laterally between a pressure side and a suction side. The airfoil extends longitudinally along a camber line from a leading edge to a trailing edge. The airfoil includes a first section and a second section arranged longitudinally between the first section and the trailing edge along the camber line. An angle between the camber line and a reference plane changes according to a slope as the airfoil extends longitudinally along the camber line. The slope in the second section is greater than the slope in the first section.

According to another aspect of the present disclosure, another apparatus is provided for a gas turbine engine. This engine apparatus includes an airfoil extending spanwise along a span line from a base to a tip. The airfoil extends laterally between a pressure side and a suction side. The airfoil extends longitudinally along a camber line from a leading edge to a trailing edge. An angle from the camber line to a reference plane changes according to a slope as the airfoil extends longitudinally along the camber line. The slope has a first inflection point disposed at a location beyond ten percent of a distance longitudinally along the camber line from the leading edge to the trailing edge.

According to still another aspect of the present disclosure, another apparatus is provided for a gas turbine engine. This engine apparatus includes an airfoil extending spanwise along a span line from a base to a tip. The airfoil extends laterally between a pressure side and a suction side. The airfoil extends longitudinally along a camber line from a leading edge to a trailing edge. The airfoil includes a plurality of sections longitudinally along the camber line. An angle between the camber line and a reference plane changes according to a slope as the airfoil extends longitudinally along the camber line. The slope along a first of the sections decreases as the first of the sections extends longitudinally along the camber line towards the trailing edge. The slope along a second of the sections increases as the second of the sections extends longitudinally along the camber line towards the trailing edge.

The location of the first inflection point may be prior to sixty percent of the distance longitudinally along the camber line from the leading edge to the trailing edge.

The slope may decrease to the inflection point and increase from the inflection point as the airfoil extends longitudinally along the camber line towards the trailing edge.

The airfoil may include a first section and a second section arranged longitudinally between the first section and the trailing edge along the camber line. The slope in the second section may be greater than the slope in the first section.

The reference plane may be perpendicular to a rotational axis of the gas turbine engine.

The airfoil may be one of a plurality of airfoils arranged in an array. An upstream face of the array may form the reference plane.

The airfoil may also include a third section arranged longitudinally between the second section and the trailing edge along the camber line. The slope in the third section may be less than the slope in the second section.

The airfoil may also include a third section arranged longitudinally between the first section and the leading edge along the camber line. The slope in the third section may be greater than the slope in the first section.

The slope in the third section may be greater than the slope in the second section.

The slope may have a first inflection point longitudinally along the camber line between the first section and the second section.

The first inflection point may be disposed at a location between fifteen percent and sixty percent of a distance longitudinally along the camber line from the leading edge to the trailing edge.

The first inflection point may be disposed at a location between thirty percent and forty-five percent of a distance longitudinally along the camber line from the leading edge to the trailing edge.

The slope may have a second inflection point longitudinally along the camber line between the second section and the trailing edge.

The apparatus may also include a stator vane, and the stator vane may be configured as or otherwise include the airfoil.

The apparatus may also include an inner platform and an outer platform radially outboard of the inner platform. The airfoil may extend radially between and connected to the inner platform and the outer platform.

The apparatus may also include a rotor blade, and the rotor blade may be configured as or otherwise include the airfoil.

The apparatus may also include a compressor section of the gas turbine engine.

The airfoil may be arranged within the compressor section.

The leading edge may have a sharp profile.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 2:
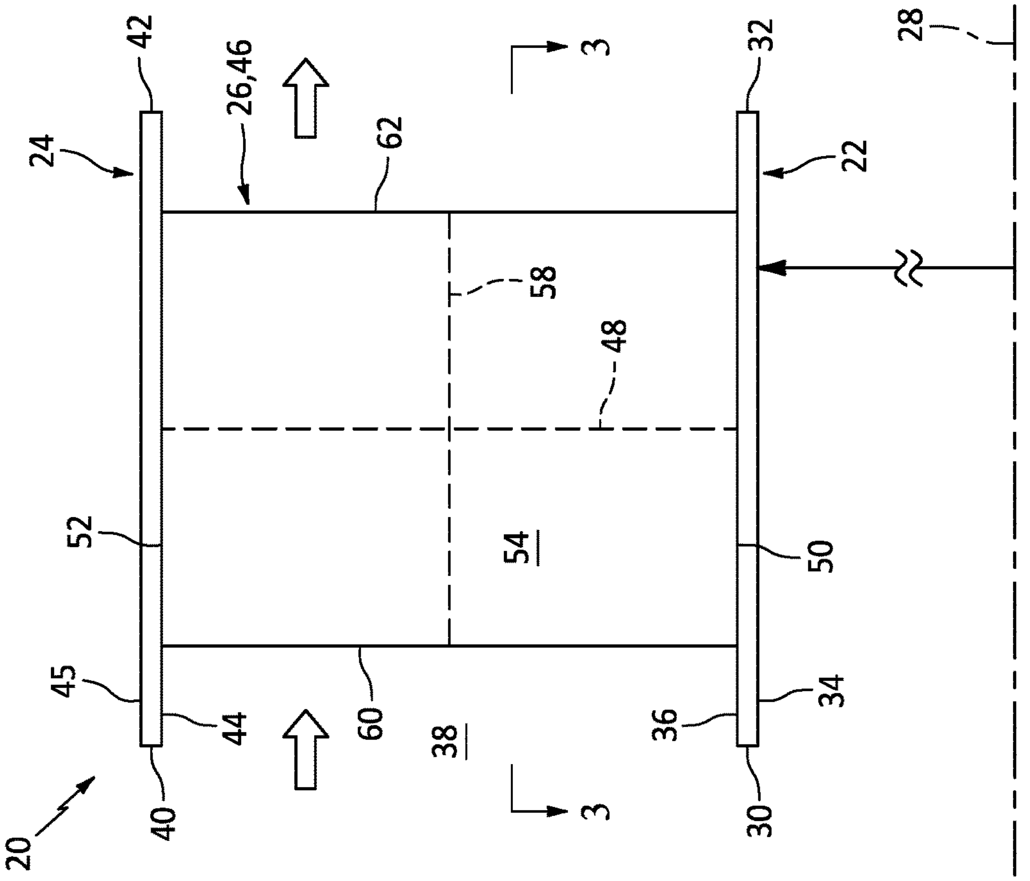
FIG. 2 is a partial schematic side sectional illustration of the stator vane array taken along line 2-2 in FIG. 1.
Figure 1:
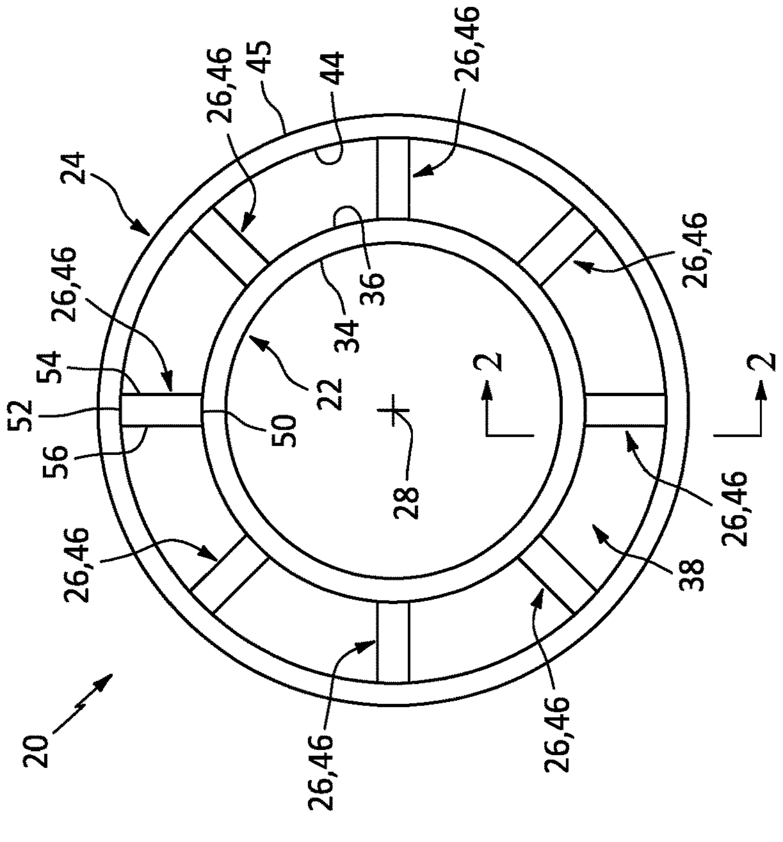
FIG. 1 is a schematic illustration of a stator vane array for a gas turbine engine.

FIGS. 1 and 2 illustrate a stator vane array 20 for a gas turbine engine. This engine vane array 20 includes an inner platform 22, an outer platform 24 and a plurality of stator vanes 26.

The inner platform 22 of FIG. 2 extends axially along an axis 28 between and to an upstream end 30 of the inner platform 22 and a downstream end 32 of the inner platform 22. Briefly, the axis 28 may be a centerline axis of the engine vane array 20, a centerline axis of one or more other components of the gas turbine engine and/or a centerline axis of the gas turbine engine in general. The axis 28 may also or alternatively be a rotational axis of one or more components (e.g., rotors) of the gas turbine engine and/or a rotational axis of the gas turbine engine in general. The inner platform 22 of FIG. 2 extends radially between and to an inner side 34 of the inner platform 22 and an outer side 36 of the inner platform 22. The inner platform outer side 36 is configured to form an inner peripheral boundary of a flowpath 38 (e.g., an annular core flowpath) through the engine vane array 20. The inner platform 22 of FIG. 1 extends circumferentially about (e.g., completely around) the axis 28, which may provide the inner platform 22 with a full-hoop (e.g., tubular) body.

The outer platform 24 of FIG. 2 extends axially along the axis 28 between and to an upstream end 40 of the outer platform 24 and a downstream end 42 of the outer platform 24. The outer platform 24 extends radially between and to an inner side 44 of the outer platform 24 and an outer side 45 of the outer platform 24. The outer platform inner side 44 is configured to form an outer peripheral boundary of the flowpath 38 through the engine vane array 20. The outer platform 24 of FIG. 1 extends circumferentially about (e.g., completely around) the axis 28, which may provide the outer platform 24 with a full-hoop (e.g., tubular) body. The outer platform 24 of FIGS. 1 and 2 is disposed radially outboard of, axially overlaps and circumferentially overlaps (e.g., circumscribes) the inner platform 22.

The stator vanes 26 of FIG. 1 are arranged circumferentially about the axis 28 in an array; e.g., a circular array. Each of the stator vanes 26 includes an airfoil 46. Each stator vane 26 and its airfoil 46 extend radially (relative to the axis 28) between and to the inner platform outer side 36 and the outer platform inner side 44. Each stator vane 26 and its airfoil 46 is connected to (e.g., formed integral with or otherwise attached to) the inner platform 22 and the outer platform 24. With this arrangement, each stator vane 26 and its airfoil 46 extends radially across the flowpath 38 between the inner platform 22 and the outer platform 24. More particularly, each airfoil 46 of FIG. 2 extends spanwise along a span line 48 of the airfoil 46 between and to a (e.g., radial inner) base 50 of the airfoil 46 and a (e.g., radial outer) tip 52 of the airfoil 46. The airfoil base 50 is adjacent the inner platform outer side 36 and may be connected to the inner platform 22. The airfoil tip 52 is adjacent the outer platform inner side 44 and may be connected to the outer platform 24.

Figure 3:
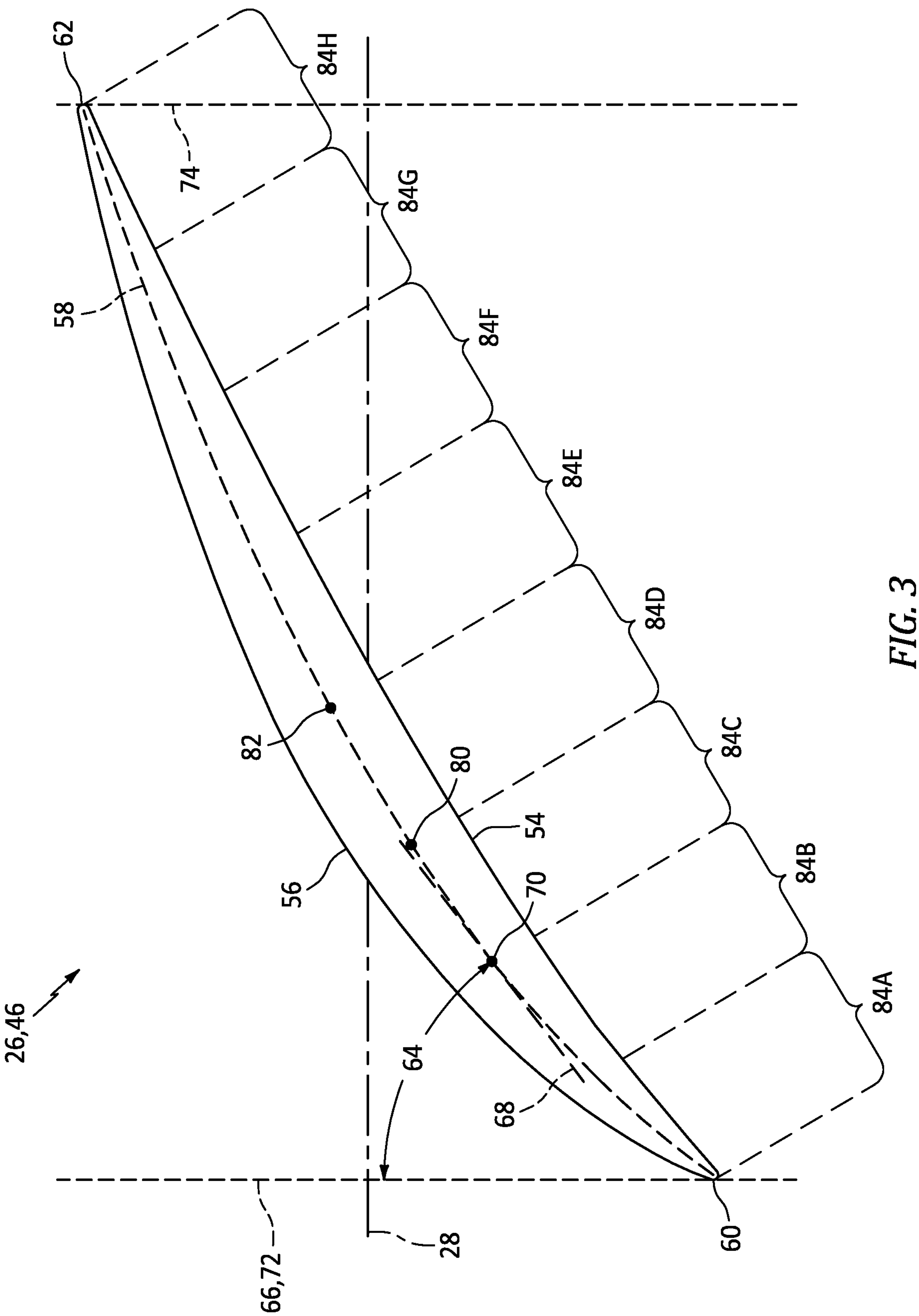
FIG. 3 is a cross-sectional illustration of an airfoil taken along line 3-3 in FIG. 2.

Referring to FIG. 3, the airfoil 46 extends laterally for a thickness of the airfoil 46 between and to a (e.g., concave) pressure side 54 of the airfoil 46 and a (e.g., convex) suction side 56 of the airfoil 46. The airfoil 46 extends longitudinally along a camber line 58 (e.g., a mean camber line) of the airfoil 46 between and to a leading edge 60 of the airfoil 46 and a trailing edge 62 of the airfoil 46. The airfoil pressure side 54 and the airfoil suction side 56 meet at the leading edge 60, and may provide the leading edge 60 with sharp profile; e.g., a pointed cross-sectional geometry. Of course, in other embodiments, it is contemplated the leading edge 60 may alternatively have an eased (e.g., rounded) profile. The airfoil pressure side 54 and the airfoil suction side 56 also meet at the trailing edge 62, and may provide the trailing edge 62 with a sharp profile. Referring to FIGS. 1 and 2, the airfoil pressure side 54 and the airfoil suction side 56 extend spanwise along the leading edge 60 and the trailing edge 62 between and to the airfoil base 50 and the airfoil tip 52.

Referring to FIG. 3, the camber line 58 has a camber line angle 64. This camber line angle 64 is measured between the camber line 58 and a reference plane 66 (or a reference line). More particularly, the camber line angle 64 is measured between a line 68 tangent to the camber line 58 (e.g., a tangent line) at a point 70 of interest and the reference plane 66; note, the point 70 may be at any location along the camber line 58 although one is shown for the purposed of illustration. The reference plane 66 may be any plane perpendicular to the axis 28. The reference plane 66, for example, may be a plane 72 formed by/at an upstream face of the array of stator vanes 26/airfoils, where the upstream face is collectively formed by the leading edges 60 of the stator vanes 26/the airfoils 46. In another example, the reference plane 66 may be a plane 74 formed by/at a downstream face of the array of stator vanes 26/airfoils 46, where the downstream face is collectively formed by the trailing edges 62 of the stator vanes 26/the airfoils 46.

The airfoil 46 of FIG. 3 is configured to promote and extend laminar boundary layer flow along its pressure side 54 and/or its suction side 56. The camber line angle 64 of FIG. 3, for example, is tailored to (e.g., continuously) change according to a (e.g., variable) slope as the airfoil 46 extends longitudinally along the camber line 58 from the leading edge 60 to the trailing edge 62. This slope may be calculated as change in camber line angle ($\Delta\beta$) over change in longitudinal distance (e.g., arc distance) along a camber line ($\Delta L$); e.g., slope=$(\Delta\beta)/(\Delta L)$. An example of the slope for an exemplary cross-section (e.g., a slice) of the airfoil 46 along the span line 48 is graphed in FIG. 4. Note, while FIGS. 3 and 4 depict exemplary characteristics for a certain location along the span line 48 of FIG. 2, the same of similar characteristics may also (or alternatively) be applied to any one or more or all other locations along the span line 48.

Figure 4:
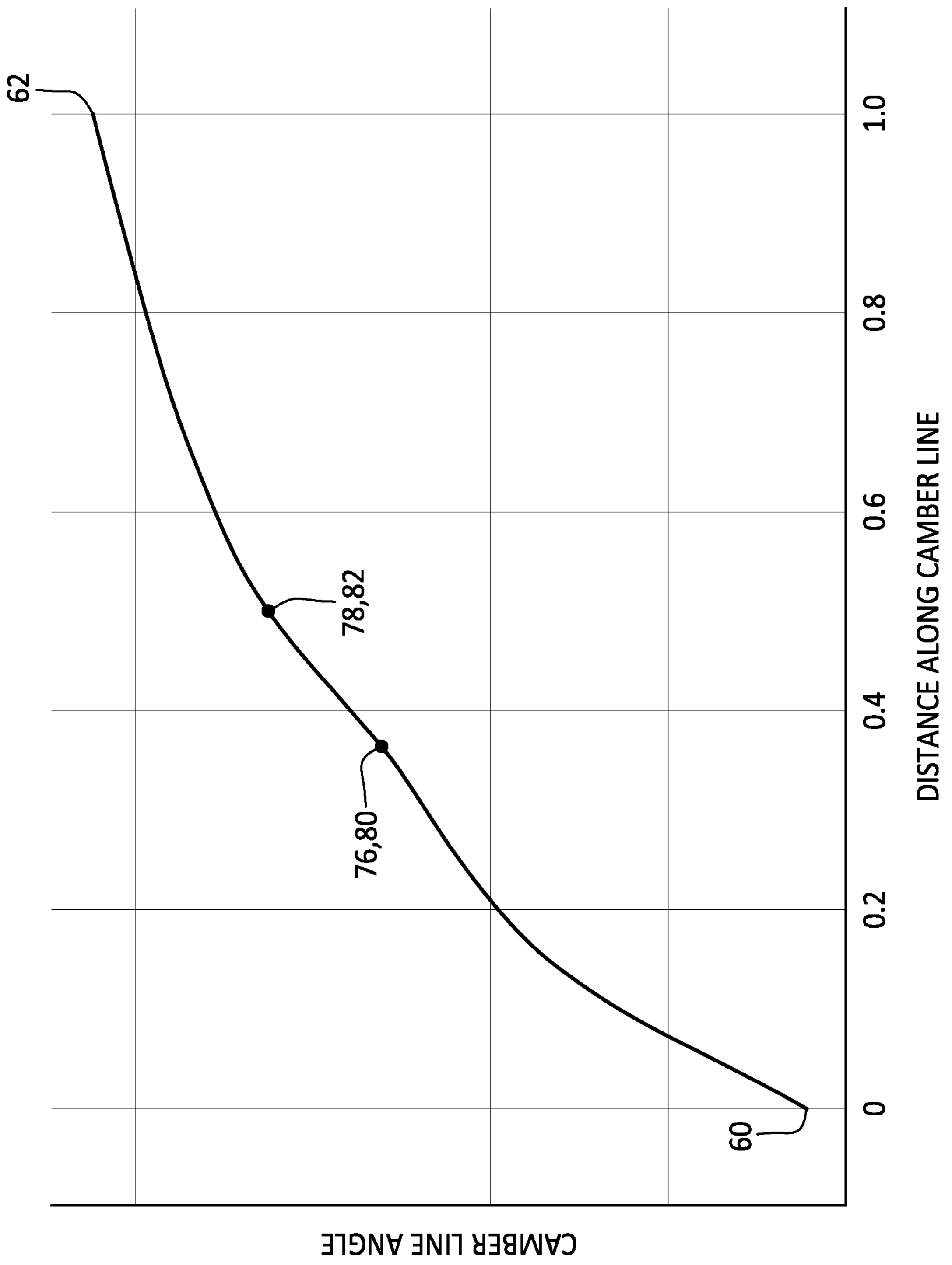
FIG. 4 is a graph plotting longitudinal distance along a camber line versus camber line angle of the airfoil.
Figure 5:
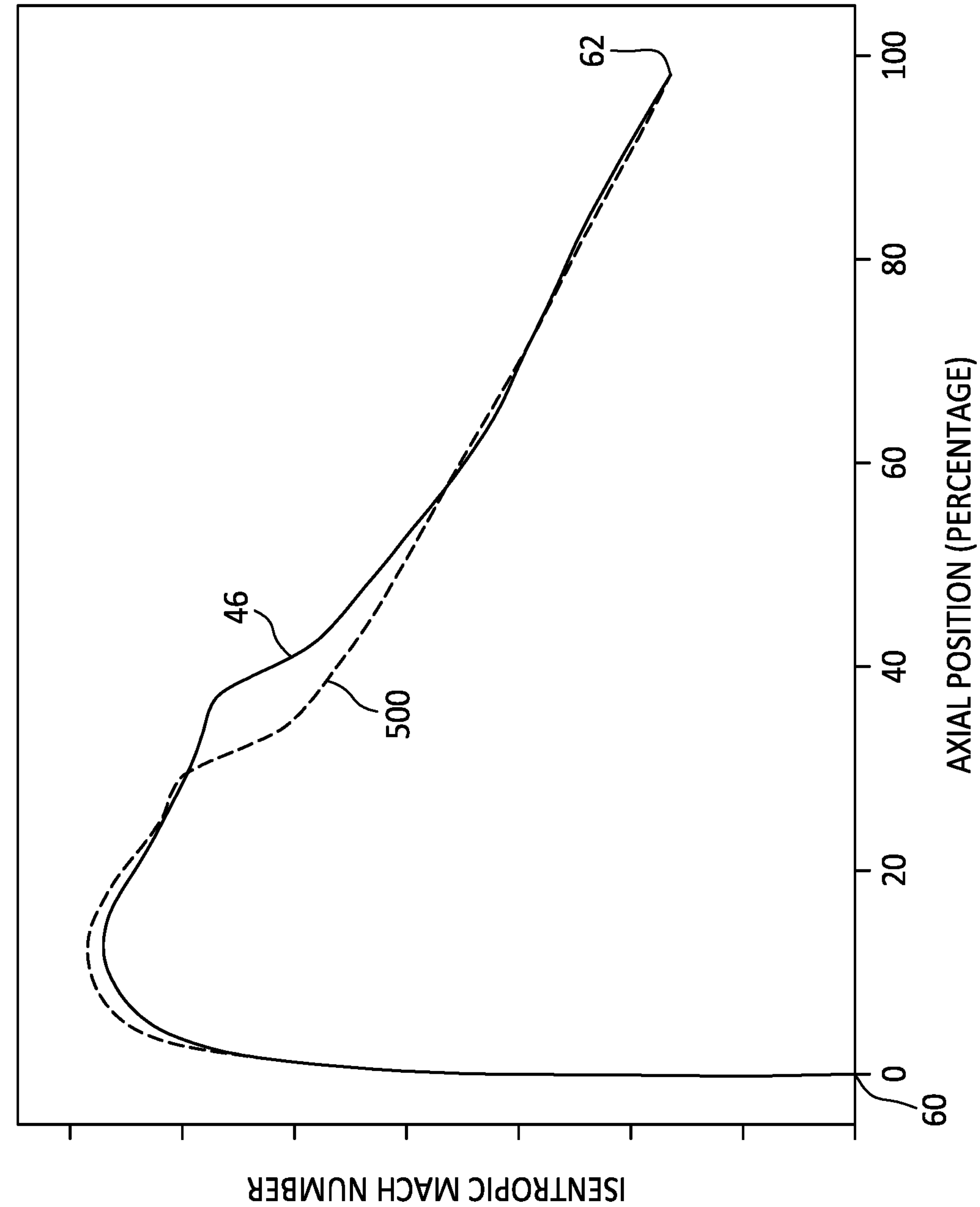
FIG. 5 is a graph plotting axial position along an axis versus Mach number of suction side boundary layer flow for the airfoil and a baseline airfoil.
Figure 6:
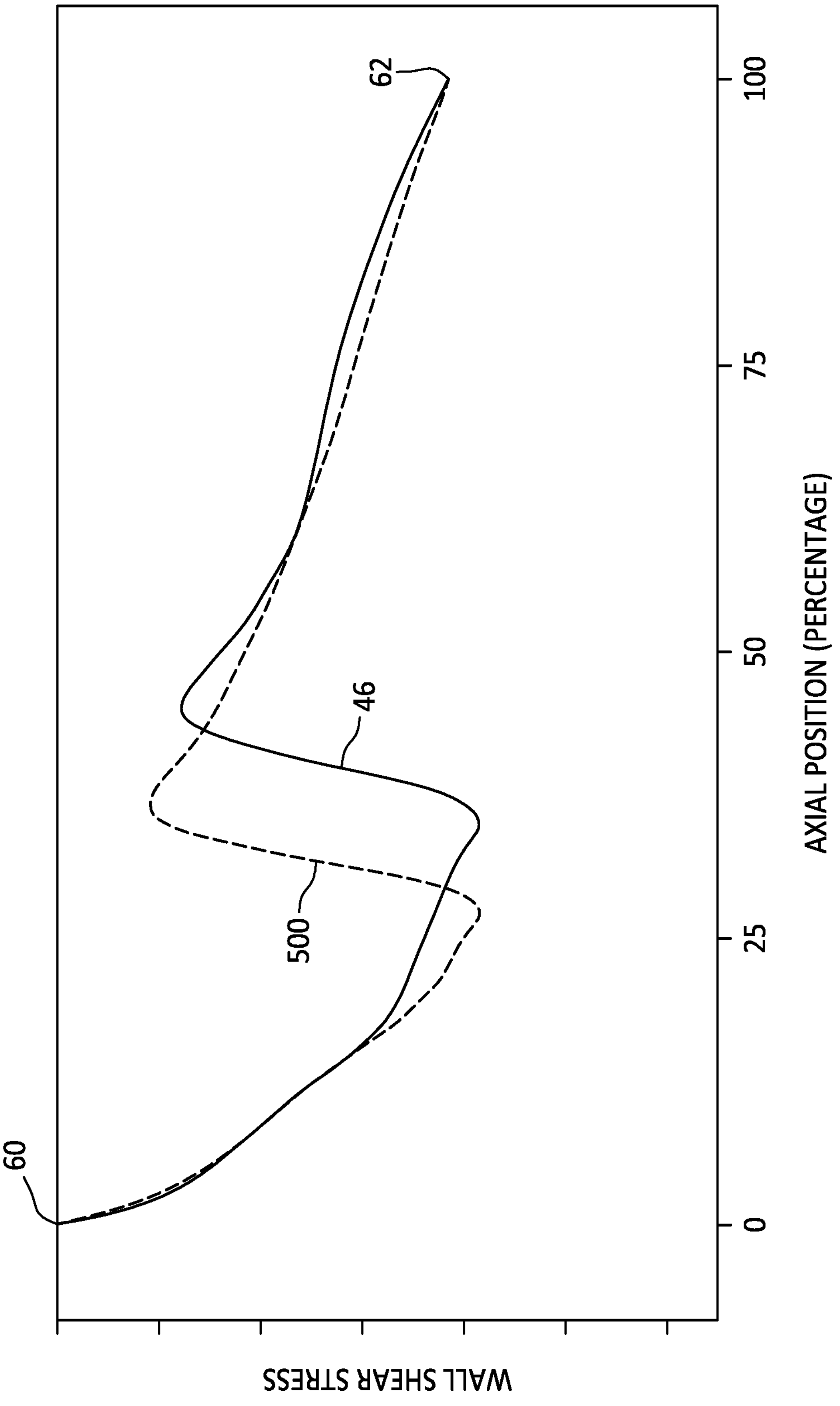
FIG. 6 is a graph plotting the axial position along the axis versus wall shear stress of the suction side boundary layer flow for the airfoil and the baseline airfoil.

The slope of FIG. 4 includes one or more inflection points 76 and 78. As the airfoil 46 extends longitudinally along the camber line 58 (e.g., from the leading edge 60) to a location 80 (see also FIG. 3) corresponding to the first inflection point 76, the slope may (e.g., gradually) decrease. As the airfoil 46 extends longitudinally along the camber line 58 from the location 80 corresponding to the first inflection point 76 to a location 82 corresponding to the second inflection point 78, the slope may (e.g., gradually) increase. As the airfoil 46 extends longitudinally along the camber line 58 from the location 82 corresponding to the second inflection point 78 (e.g., to the trailing edge 62), the slope may (e.g., gradually) decrease again. By configuring the slope with at least the first inflection point 76, a transition region between laminar and turbulent boundary layer flow may be extended along the airfoil pressure side 54 and/or the airfoil suction side 56 (see FIG. 3). This may be exemplified in FIGS. 5 and 6. FIG. 5 graphs an axial position versus an isentropic Mach number of suction side boundary layer flow for the airfoil 46 with the one or more inflection points 76 and 78 and for a baseline airfoil 500 without any inflection points. FIG. 6 graphs the axial position versus wall shear stress of the section side boundary layer flow for the airfoil 46 with the one or more inflection points 76 and 78 and for the baseline airfoil 500 without any inflection points.

Referring to FIG. 4, the location 80 corresponding to the first inflection point 76 may be disposed between fifteen percent (15%) and sixty percent (60%) of the longitudinal distance along the camber line 58 from the leading edge 60 to the trailing edge 62. More particularly, the location 80 corresponding to the first inflection point 76 may be disposed between thirty percent (30%) and forty-five percent (45%) of the longitudinal distance, or between thirty-five percent (35%) and forty percent (40%) of the longitudinal distance. The present disclosure, however, is not limited to the foregoing exemplary first inflection point locations. For example, the location corresponding to the first inflection point 76 may be disposed anywhere beyond (e.g., downstream of) five percent (5%), ten percent (10%) or twenty percent (20%) of the longitudinal distance towards the trailing edge 62.

The location 82 corresponding to the second inflection point 78 may be disposed somewhere along the camber line 58 downstream of the first inflection point location 80; e.g., longitudinally between the first inflection point location 80 and the trailing edge 62. The location 82 corresponding to the second inflection point 78, for example, may be disposed between thirty percent (30%) and eighty percent (80%) of the longitudinal distance along the camber line 58 from the leading edge 60 to the trailing edge 62. The present disclosure, however, is not limited to the foregoing exemplary second inflection point locations. Furthermore, it is contemplated the slope may be configured without the second inflection point 78, or with more than two inflections points along the camber line 58.

The airfoil 46 of FIG. 3 may be divided into a plurality of longitudinal (e.g., end-to-end) sections 84A-H (generally referred to as "84") along the camber line 58. Note, while the airfoil sections 84 are shown in FIG. 3 with common (e.g., the same) lengths along the camber line 58, the present disclosure is not limited thereto. The airfoil sections 84A-C are arranged upstream of the first inflection point location 80; e.g., sequentially between the leading edge 60 and the first inflection point location 80. The airfoil section 84D is arranged between (and may be bounded by) the first inflection point location 80 and the second inflection point location 82. The airfoil sections 84E-H are arranged downstream of the second inflection point location 82; e.g., sequentially between the second inflection point location 82 and the trailing edge 62. The slope in and/or along the airfoil section 84A, 84B is greater than the slope in and/or along the airfoil section 84C. The slope in and/or along the airfoil section 84D is greater than the slope in and/or along the airfoil section 84C. However, the slope in and/or along the airfoil section 84D may be less than (or equal to) the slope in and/or along the airfoil section 84A, 84B. The slope in and/or along the airfoil section 84D is greater than the slope in and/or along the airfoil section 84E, 84F, 84G, 84H.

Referring again to FIGS. 1 and 2, the engine vane array 20 may be configured as a compressor vane array for arranging in a compressor section of the gas turbine engine. The present disclosure, however, is not limited to such an exemplary application. The engine vane array 20, for example, may alternatively be configured as a turbine vane array for arranging in a turbine section of the gas turbine engine, or an exhaust vane array for arranging in an exhaust section of the gas turbine engine. Furthermore, it is contemplated the airfoil profile described above may also be applied to a rotor blade airfoil. A fan rotor, a compressor rotor or a turbine rotor, for example, may include an array of the airfoils 46.

Figure 7:
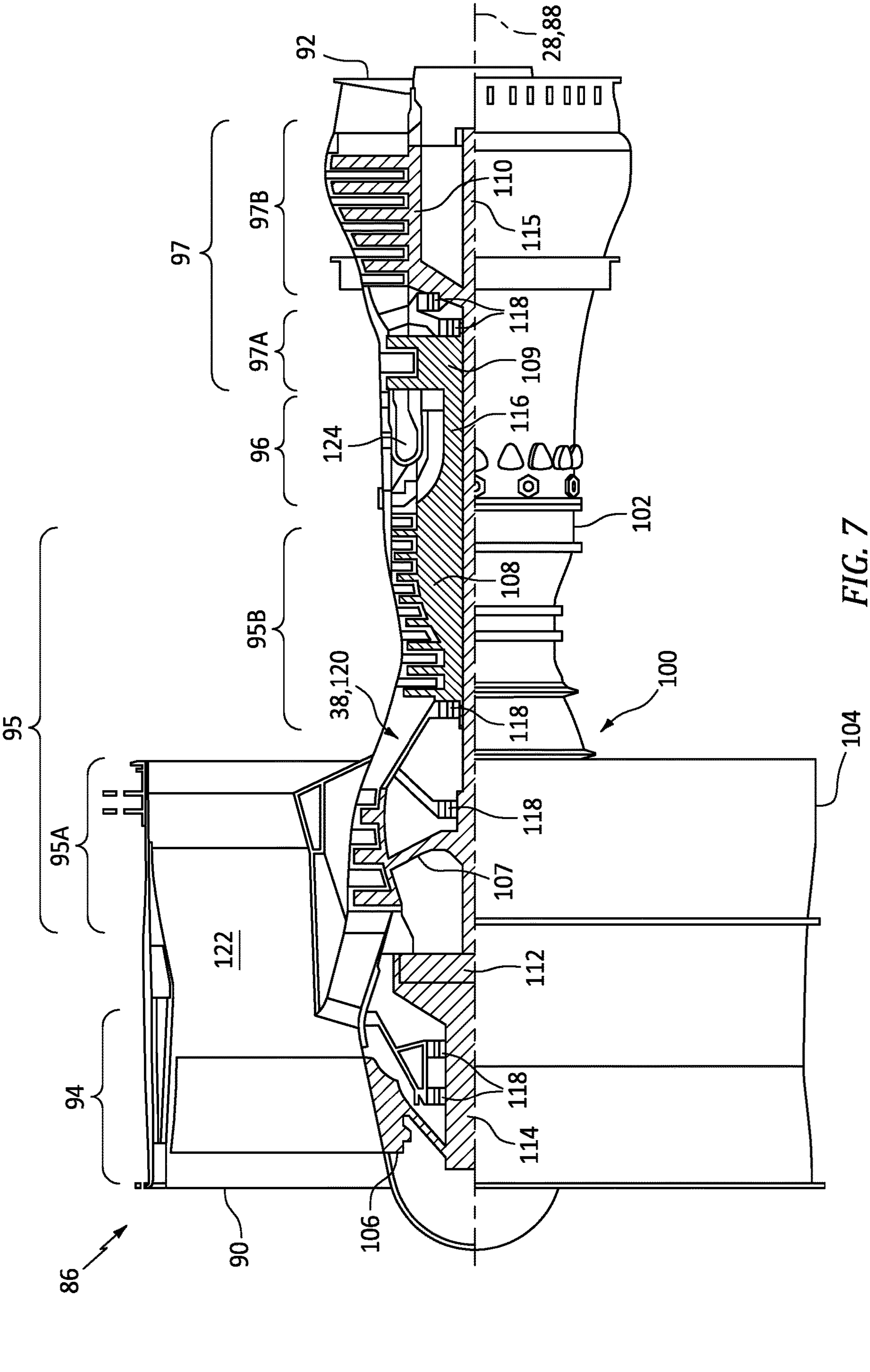
FIG. 7 is a side cutaway illustration of a geared gas turbine engine which may include the stator vane array.

FIG. 7 is a side cutaway illustration of a geared gas turbine engine 86 which may be configured with one or more arrays of the airfoils 46 (e.g., see FIGS. 1-3). This gas turbine engine 86 extends along an axial centerline 88 (e.g., the axis 28) between an upstream airflow inlet 90 and a downstream airflow exhaust 92. The gas turbine engine 86 includes a fan section 94, a compressor section 95, a combustor section 96 and a turbine section 97. The compressor section 95 includes a low pressure compressor (LPC) section 95A and a high pressure compressor (HPC) section 95B. The turbine section 97 includes a high pressure turbine (HPT) section 97A and a low pressure turbine (LPT) section 97B. It is contemplated the one or more arrays of the airfoils 46 may be included in any one or more of the foregoing engine sections 94, 95A, 95B, 97A and/or 97B, as stator vane airfoils and/or as rotor blade airfoils.

The engine sections 94-97B are arranged sequentially along the centerline 88 within an engine housing 100. This engine housing 100 includes an inner case 102 (e.g., a core case) and an outer case 104 (e.g., a fan case). The inner case 102 may house one or more of the engine sections 95A-97B, which engine sections 95A-97B may form a core of the gas turbine engine 86. The outer case 104 may house at least the fan section 94.

Each of the engine sections 94, 95A, 95B, 97A and 97B includes a respective rotor 106-110. Each of these rotors 106-110 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 106 is connected to a geartrain 112, for example, through a fan shaft 114. The geartrain 112 and the LPC rotor 107 are connected to and driven by the LPT rotor 110 through a low speed shaft 115. The HPC rotor 108 is connected to and driven by the HPT rotor 109 through a high speed shaft 116. The shafts 114-116 are rotatably supported by a plurality of bearings 118; e.g., rolling element and/or thrust bearings. Each of these bearings 118 is connected to the engine housing 100 by at least one stationary structure such as, for example, an annular support strut.

During operation, air enters the gas turbine engine 86 through the airflow inlet 90. This air is directed through the fan section 94 and into a core flowpath 120 (e.g., the flowpath 38) and a bypass flowpath 122. The core flowpath 120 extends sequentially through the engine sections 95A-97B. The air within the core flowpath 120 may be referred to as "core air". The bypass flowpath 122 extends through a bypass duct, which bypasses the engine core. The air within the bypass flowpath 122 may be referred to as "bypass air".

The core air is compressed by the LPC rotor 107 and the HPC rotor 108 and directed into a (e.g., annular) combustion chamber 124 of a (e.g., annular) combustor in the combustor section 96. Fuel is injected into the combustion chamber 124 and mixed with the compressed core air to provide a fuel-air mixture. This fuel-air mixture is ignited and combustion products thereof flow through and sequentially cause the HPT rotor 109 and the LPT rotor 110 to rotate. The rotation of the HPT rotor 109 and the LPT rotor 110 respectively drive rotation of the HPC rotor 108 and the LPC rotor 107 and, thus, compression of the air received from a core airflow inlet. The rotation of the LPT rotor 110 also drives rotation of the fan rotor 106, which propels bypass air through and out of the bypass flowpath 122. The propulsion of the bypass air may account for a majority of thrust generated by the turbine engine.

The airfoils 46 may be included in various gas turbine engines other than the one described above. The airfoils 46, for example, may be included in a geared gas turbine engine where a geartrain connects one or more shafts to one or more rotors in a fan section, a compressor section and/or any other engine section. Alternatively, the airfoils 46 may be included in a direct drive gas turbine engine configured without a geartrain. The airfoils 46 may be included in a gas turbine engine configured with a single spool, with two spools (e.g., see FIG. 7), or with more than two spools. The gas turbine engine may be configured as a turbofan engine, a turbojet engine, a turboprop engine, a turboshaft engine, a propfan engine, a pusher fan engine or any other type of gas turbine engine including hybrid engines. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:

an airfoil extending spanwise along a span line from a base to a tip, the airfoil extending laterally between a pressure side and a suction side, and the airfoil extending longitudinally along a camber line from a leading edge to a trailing edge; and the airfoil including a first section and a second section arranged longitudinally between the first section and the trailing edge along the camber line;

wherein an angle between the camber line and a reference plane changes according to a slope as the airfoil extends longitudinally along the camber line;

wherein the slope in the second section is greater than the slope in the first section; and wherein an entirety of the suction side is convex as the airfoil extends longitudinally along the camber line from the leading edge to the trailing edge.

2. The apparatus of claim 1, wherein the reference plane is perpendicular to a rotational axis of the gas turbine engine.

3. The apparatus of claim 1, wherein the airfoil is one of a plurality of airfoils arranged in an array; and an upstream face of the array forms the reference plane.

4. The apparatus of claim 1, wherein the airfoil further includes a third section arranged longitudinally between the second section and the trailing edge along the camber line; and the slope in the third section is less than the slope in the second section.

5. The apparatus of claim 1, wherein the airfoil further includes a third section arranged longitudinally between the first section and the leading edge along the camber line; and the slope in the third section is greater than the slope in the first section.

6. The apparatus of claim 5, wherein the slope in the third section is greater than the slope in the second section.

7. The apparatus of claim 1, wherein the slope has a first inflection point longitudinally along the camber line between the first section and the second section.

8. The apparatus of claim 7, wherein the first inflection point is disposed at a location between fifteen percent and sixty percent of a distance longitudinally along the camber line from the leading edge to the trailing edge.

9. The apparatus of claim 7, wherein the first inflection point is disposed at a location between thirty percent and forty-five percent of a distance longitudinally along the camber line from the leading edge to the trailing edge.

10. The apparatus of claim 7, wherein the slope has a second inflection point longitudinally along the camber line between the second section and the trailing edge.

11. The apparatus of claim 1, further comprising a stator vane comprising the airfoil.

12. The apparatus of claim 1, further comprising:

an inner platform; and an outer platform radially outboard of the inner platform;

the airfoil extending radially between and connected to the inner platform and the outer platform.

13. The apparatus of claim 1, further comprising a rotor blade comprising the airfoil.

14. The apparatus of claim 1, further comprising:

a compressor section of the gas turbine engine;

the airfoil arranged within the compressor section.

15. The apparatus of claim 1, wherein the leading edge has a sharp profile.

16. An apparatus for a gas turbine engine, comprising: an airfoil extending spanwise along a span line from a base to a tip, the airfoil extending laterally between a pressure side and a suction side, and the airfoil extending longitudinally along a camber line from a leading edge to a trailing edge;

wherein an angle from the camber line to a reference plane changes according to a slope as the airfoil extends longitudinally along the camber line;

wherein the slope has a first inflection point disposed at a location beyond ten percent of a distance longitudinally along the camber line from the leading edge to the trailing edge; and wherein at least one of an entirety of the suction side is convex as the airfoil extends longitudinally along the camber line from the leading edge to the trailing edge; or an entirety of the pressure side is concave as the airfoil extends longitudinally along the camber line from the leading edge to the trailing edge.

17. The apparatus of claim 16, wherein the location of the first inflection point is prior to sixty percent of the distance longitudinally along the camber line from the leading edge to the trailing edge.

18. The apparatus of claim 16, wherein the slope decreases to the inflection point and increases from the inflection point as the airfoil extends longitudinally along the camber line towards the trailing edge.

19. The apparatus of claim 16, wherein the airfoil includes a first section and a second section arranged longitudinally between the first section and the trailing edge along the camber line; and the slope in the second section is greater than the slope in the first section.

20. An apparatus for a gas turbine engine, comprising:

an airfoil extending spanwise along a span line from a base to a tip, the airfoil extending laterally between a pressure side and a suction side, and the airfoil extending longitudinally along a camber line from a leading edge to a trailing edge; and the airfoil including a plurality of sections longitudinally along the camber line;

wherein an angle between the camber line and a reference plane changes according to a slope as the airfoil extends longitudinally along the camber line;

wherein the slope along a first of the plurality of sections decreases as the first of the plurality of sections extends longitudinally along the camber line towards the trailing edge;

wherein the slope along a second of the plurality of sections increases as the second of the plurality of sections extends longitudinally along the camber line towards the trailing edge;

wherein an entirety of the suction side is convex as the airfoil extends longitudinally along the camber line from the leading edge to the trailing edge; and wherein the pressure side is concave as the airfoil extends longitudinally along the camber line from the leading edge to the trailing edge.

* * * * *